(12) United States Patent
Dupuy

(10) Patent No.: US 6,366,623 B1
(45) Date of Patent: *Apr. 2, 2002

(54) DATA TRANSMISSION FRAME AND METHODS AND APPARATUSES FOR TRANSMITTING AND RECEIVING SUCH A FRAME

(75) Inventor: Pierre Dupuy, Paris (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/989,393

(22) Filed: Dec. 12, 1997

(30) Foreign Application Priority Data

Dec. 13, 1996 (FR) .............................. 96 15385

(51) Int. Cl.⁷ .............................................. H04L 27/06
(52) U.S. Cl. ...................... 375/340; 370/470; 370/505
(58) Field of Search ................. 375/368, 367, 375/145, 340; 370/470, 505, 340

(56) References Cited

U.S. PATENT DOCUMENTS

| 4,477,912 A | * | 10/1984 | Russell | 375/367 |
| 4,527,275 A | * | 7/1985 | Russell | 375/145 |
| 5,784,597 A | * | 7/1998 | Chiu et al. | 395/552 |

FOREIGN PATENT DOCUMENTS

EP   0 367 215 A2   5/1990

* cited by examiner

Primary Examiner—Chi Pham
Assistant Examiner—Kevin M Burd
(74) Attorney, Agent, or Firm—Sughrue Mion, PLLC

(57) ABSTRACT

A data transmission frame containing payload data, preceded by a synchronization pattern (F), is essentially characterized in that it does not contain any payload data sequences that imitate the synchronization pattern. The payload data sequences that imitate the synchronization pattern are referred to as "forbidden" sequences. These forbidden sequences are replaced with "substitute" data (S0, S1, S2), thereby enabling the forbidden sequences to be re-inserted among the payload data upon reception.

26 Claims, 4 Drawing Sheets

DATA TRANSMISSION FRAME AND METHODS AND APPARATUSES FOR TRANSMITTING AND RECEIVING SUCH A FRAME

BACKGROUND OF THE INVENTION

1. Field of the Invention

The present invention relates to data transmission techniques, and more particularly to data transmission techniques in which the data transmitted is structured in frames, each of which contains payload data preceded by a synchronization pattern serving to enable receiver equipment to be synchronized to the transmitter equipment.

2. Description of Related Art

In this type of transmission, it is necessary to make provisions for coping with the risks of the synchronization pattern being imitated by the payload data. It is thus common to insert bits among the payload bits to avoid such imitation: e.g., if the synchronization pattern is a sequence of eight "0" bits, then a "1" bit is inserted every seven bits.

However, it can be understood that the bits inserted in this way are inserted to the detriment of payload data bits, which raises a problem of frame efficiency in particular when, with data-rate remaining constant, it is desirable for increases to the payload transmitted to be possible.

A particular object of the present invention is to provide a solution to that problem.

Furthermore, Document EP 0 367 215 discloses a method which, besides any frame synchronization problem, prevents a string of sixteen "0" bits in a transmitted frame from disturbing bit clock recovery on reception, wherein the frame is subdivided into 8-bit time slots. In other words, the frame is analyzed by means of a fixed window of width 8 bits, and when sequences of eight 0 bits are detected, instead of transmitting such sequences, 8-bit sequences are transmitted that contain data identifying the time slots of the frame into which such sequences must be re-inserted on reception.

BRIEF SUMMARY OF THE INVENTION

The present invention provides a data transmission frame containing payload data preceded by a synchronization pattern, said frame being essentially characterized in that it does not contain any payload data sequences that imitate said synchronization pattern, such sequences also being referred to as "forbidden" sequences, and being replaced with "substitute" data serving to enable the forbidden sequences to be re-inserted, on reception, among the received payload data.

Thus, since any payload data sequences that imitate said synchronization pattern are removed prior to transmission, it is no longer necessary to transmit bits at regular intervals to avoid such imitation, and, provided that the number of items of said substitute data does not exceed the number of items of payload data removed in this way, the efficiency of the frame can be improved.

According to another characteristic, said substitute data itself comprises two types of data, namely:

"operating" data making it possible, on reception, to determine the extent to which forbidden sequences were present in the payload data to be transmitted; and "address" data making it possible, on reception, to determine more precisely the location(s) at which a forbidden sequence is to be inserted among the received payload data.

Furthermore, in Document EP 0 367 215, since at the most 7 bits in a sequence of 8 bits are available for indicating that time slot into which a sequence of eight 0 bits must be re-inserted, the maximum number of time slots per frame is equal to $2^7$ (i.e., 128), and so the maximum number of bits per frame is equal to $8 \times 2^7$ (i.e., 1024).

The present invention makes it possible, in particular, with the same number N of bits in a forbidden sequence, to increase the maximum number M of bits per frame.

Thus, according to another characteristic, the number of bits in a substitute sequence is equal to the number of bits in a forbidden sequence, and, according to another characteristic, with "n" bits out of the N bits of a substitute sequence being used to constitute said address data (where "n" is not more than N−1), the maximum number M of bits per frame is equal to $2^n$.

Thus, by way of comparison with the above-mentioned document, with N equal to 16, and "n" equal to N−1, the number M obtained with the present invention is equal to 32,768, which is much higher than the 1024 bits obtained as defined in the above-;mentioned document.

The present invention also provides a method of transmitting such frames, making it possible to form such frames from an incident stream of payload data, said method being essentially characterized in that it comprises the following steps:

analyzing said incident stream to detect any payload data sequences that imitate said forbidden sequence;

computing substitute data to enable forbidden sequences to be re-inserted, on reception, among the received payload data; and transmitting payload data that contains no forbidden sequences, and substitute data computed in this way, to form said frame.

According to another characteristic, the analyzing step is performed by means of a sliding window of width equal to N bits, where N designates the number of bits in a forbidden sequence.

The present invention also provides corresponding transmitter apparatus.

The present invention also provides a method of receiving such frames, making it possible to extract a stream of payload data from such frames received in this way.

The present invention also provides corresponding receiver equipment.

The present invention is particularly applicable to data transmission within the infrastructures of a radio-communications network for mobile stations, such as in particular the Global System for Mobile Communications (GSM) network. Payload data is conveyed in such infrastructures by means of such frames, each of which comprises payload data preceded by a synchronization pattern, in particular Transcoder/Rate Adapter Unit (TRAU) frames. The data rate of such frames thus sets the maximum data rate for the data-transmission services offered by the network, which maximum data rate is currently 9600 bits per second (bit/s) for 16-kbit/s TRATJ frames, or for frames obtained by multiplexing 8-kbit/s TRAU frames in pairs. The present invention thus makes it possible to increase the maximum data rate beyond current limits, land to transmit data at a data rate higher than 9600 bit/s, by making it possible to increase the payload conveyed by such 16-kbit/s TRAU frames or by such frames obtained by multiplexing such 8-bit/s TRAU frames in pairs.

BRIEF DESCRIPTION OF THE DRAWINGS

Other objects and characteristics of the present invention appear on reading the following description of implementations given with reference to the accompanying drawings, in which.

DETAILED DESCRIPTION OF THE INVENTION

By way of example, in the following description, the synchronization pattern is formed of a sequence of 0 bits, which corresponds in particular to the above-mentioned application to 8 kbit/s and 16 kbit/s "TRAU" frames, the synchronization pattern of the 8 kbit/s TRAU frame being formed of a sequence of eight 0 bits, and the synchronization pattern of the 16 kbit/s TRAU frame being formed of sixteen 0 bits.

Figure 1:
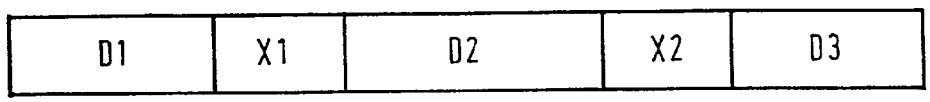
FIG. 1 is a diagram showing an example of a payload data sequence to be transmitted.

Since there is always a possibility that a payload data sequence to be transmitted might be made up both of "authorized" sequences that do not themselves contain sequences imitating the synchronization pattern and also of "forbidden" sequences that do imitate the synchronization pattern, FIG. 1 shows such a payload data sequence made up, by way of example, of three authorized sequences referenced D1, D2, and D3, and of two forbidden sequences referenced X1 and X2, the order of the sequences in the payload data sequence being, in this example, D1 X1 D2 X2 D3.

Figure 2:
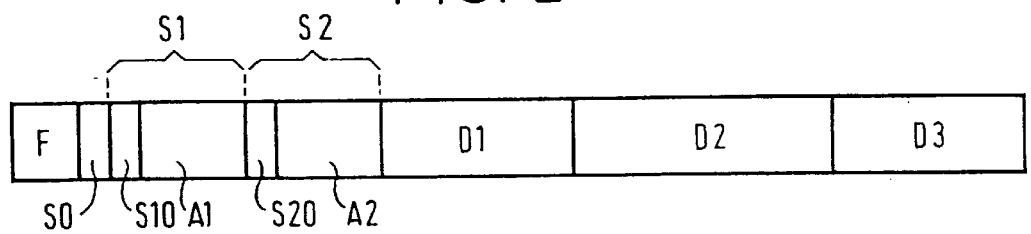
FIGS. 2, 3 and 4 are diagrams respectively showing first, second, and third examples of frames of the invention, enabling such a payload data sequence to be transmitted.
Figure 3:
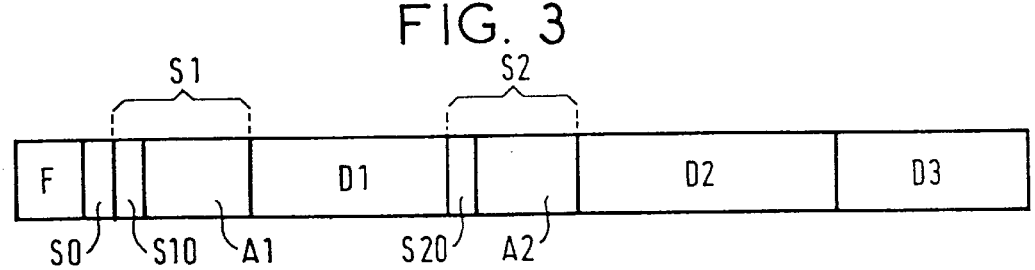
Figure 4:
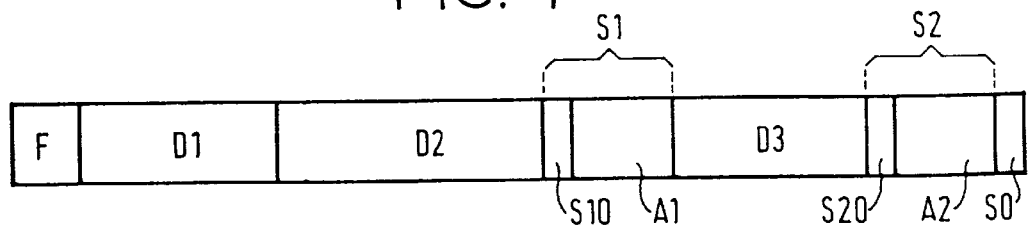

As shown in FIGS. 2 to 4, the frame of the invention enabling such a payload data sequence to be transmitted contains no forbidden sequence such as X1 or X2, but rather it contains "substitute" data serving to enable the forbidden sequences to be re-inserted, on reception, among the received payload data.

The substitute data itself advantageously comprises two types of data, namely:

"operating" data enabling receiver equipment to determine the extent to which the payload data sequence as transmitted differs from the payload data sequence to be transmitted, i.e., the extent to which forbidden sequences are present in the payload data sequence to be transmitted; and "address" data enabling receiver equipment to determine more precisely the location(s) at which a forbidden sequence must be inserted among the useful data as received.

In the example shown, said address data, referenced A1 and A2, is contained in "substitute" sequences, referenced S1 and S2, which are used as substitutes for respective ones of the forbidden sequences X1 and X2 (also referred to as "substituted" sequences). The substitute sequence S1 thus contains an address A1 enabling, in the example shown, the receiver equipment to insert the forbidden sequence X1 between the received sequences corresponding to the authorized sequences (or non-substituted sequences) D1 and D2. The substitute sequence S2 contains an address A2 enabling the receiver equipment to insert the forbidden sequence X2 between the received sequences corresponding to the authorized sequences (or non-substituted sequences) D2 and D3.

By way of example, said operating data may comprise:

first operating data, such as the data referenced S0 in FIGS. 2 to 4, transmitted at a determined location after the synchronization pattern F (e.g., immediately after the synchronization pattern), and indicating whether or not the payload data sequence as transmitted differs from the payload data sequence to be transmitted, i.e., whether or not the payload data sequence as transmitted contains substituted sequences; and second operating data, such as the data referenced S10 and S20 in FIGS. 2 to 4, advantageously transmitted in said substitute sequences such as S1 and S2, and indicating whether or not each of the substitute sequences is the last in the frame as transmitted.

In another example (not shown specifically), the operating data may also include the number (which may be zero) of substituted sequences contained in the payload data sequence as transmitted.

Figure 5:
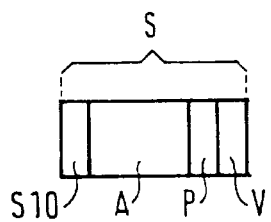
FIG. 5 is a diagram showing an example of the contents of a "substitute" sequence transmitted in a frame of the invention.

FIG. 5 is a diagram showing an example of the contents of a substitute sequence.

In this example, a substitute sequence, generally referenced S, contains:

1. said second operating data, e.g., such as S10, e.g., constituted by a 1 bit or by a 0 bit depending on whether or not the substitute sequence in question is the last in the frame as transmitted;

2. address data,; such as A1 or A2, e.g., constituted by a binary number having "n" bits and indicating the rank of a bit in a sequence of 2n payload bits to be transmitted;

3. protective data, referenced P, for protecting the substitute sequence against transmission errors (the protective data being, for example, constituted by a parity bit); and 4. "locking" data, referenced VI serving to prevent a forbidden sequence from being reproduced by inserting a substitute sequence into the frame as transmitted (such locking data being, for example, constituted by a 1 bit in the example in question in which a forbidden sequence is formed of 0 bits only).

Thus, in this example, the number "n" of bits in a substitute sequence that are used to constitute said address data is equal to N−3, where N designates the number of bits in a substitute sequence. The maximum number M of bits per frame is then equal to 2N−3. More generally, the maximum number M of bits per frame is equal to 2n, where Ant is not more N−1 (the case when "n" is equal to N−1 corresponding to the case when the data P and V is not necessary, and when the data S10 comprises a single bit only).

In the example shown in FIG. 2, the set formed by the operating data and by the address data (i.e., the set formed by the first operating data S0 and by the substitute sequences such as S1 and S2 themselves containing second operating data such as S10 and S20 and address data such as A1 and A2) is transmitted prior to the set of payload data.

This example is more particularly suitable when the lapse of time at the end of which the payload data is extracted from such a frame on reception is not necessarily fixed, such a lapse of time varying, in this example, essentially as a function of the number of substitute sequences present in the frame. This can be unacceptable in certain applications, e.g., such as the above-mentioned application to transmission within the infrastructures of a radio-communications network for mobile stations, in particular the GSM network.

This is avoided in the example shown in FIG. 3.

More precisely, in this example, the first substitute sequence S1 is transmitted at a determined location after the first operating data S0, itself transmitted at a determined location after the synchronization pattern (e.g., the first substitute sequence S1 is transmitted immediately after the first operating data S0, itself transmitted immediately after the synchronization pattern), and the second substitute sequence S2 is transmitted in place or the first substituted sequence X1. (or more generally the kth substitute sequence is transmitted in place of the k−1th substituted sequence).

In addition, the examples shown in FIGS. 2 and 3 are more particularly suitable when there is no constraint on the lapse of time at the end of which such frames can be formed in this way from an incident stream of payload data. In these examples, the lapse of time being equal to the total time taken to analyze an incident payload data sequence, and that time is necessary to enable the operating data to be obtained.

This can be prohibitive in certain applications, such as the above-mentioned application to data transmission within the infrastructures of a radio-communications network for mobile stations, and in particular, a GSM network.

The example shown in FIG. 4 makes it possible to satisfy such a constraint. In this example, said operating data is inverted compared with the cases shown in FIGS. 2 and 3 in that:

1. instead of being inserted after the synchronization pattern of the frame in question, the first operating data such as S0 indicating whether or not the payload data sequence as transmitted differs from the payload data sequence to be transmitted is inserted at the end of the frame, i.e., before the synchronization pattern of the following frame; and 2. instead of indicating whether or not the corresponding substitute sequence such as S1 and S2 is the last starting from the beginning of the frame, the second operating data such as S10 and S20 indicates whether or not it is the last starting from the end of the frame.

It should be noted that such a frame cannot then be used on reception until the whole of the frame has been received, but this does not give rise to any significant delay, unlike the analysis time that would have been necessary on transmission.

Figure 7:
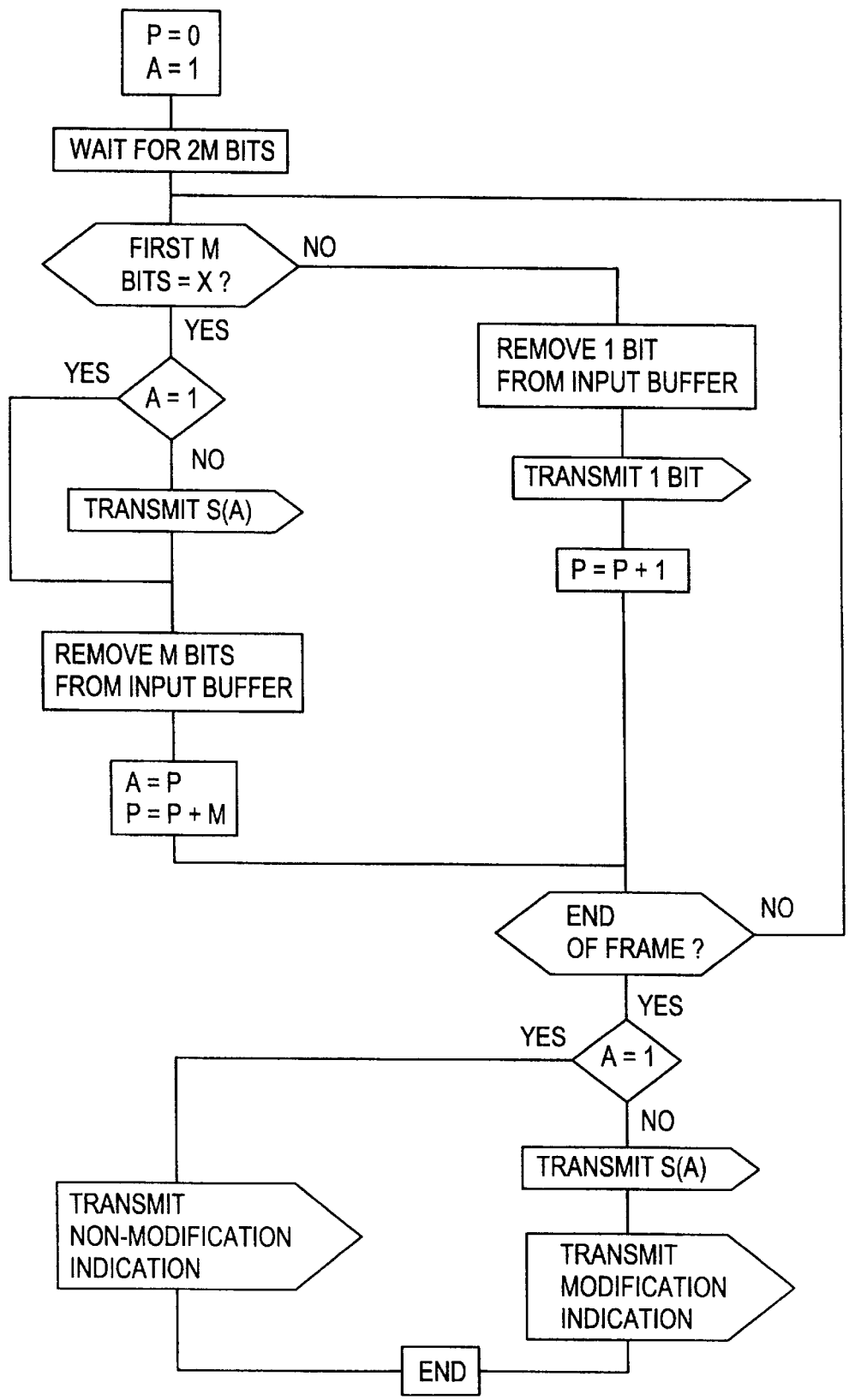
FIG. 7 is a flow chart showing a method of forming frames as in said third example from an incident stream of payload data.

It is still necessary to start analyzing the payload data sequence to be transmitted before it is possible to form a corresponding frame, and transmitting such frames is therefore delayed slightly, as shown in FIG. 7.

Furthermore, in the example shown, the second (i.e., the last, in this example) substitute sequence S2 is transmitted at a determined location before the first operating data S0 which is itself transmitted at a determined location before the synchronization pattern of the following frame (e.g., the last substitute sequence is transmitted immediately after the first operating data S0 which is itself transmitted immediately before the synchronization pattern of the following frame). The first substitute sequence S1 is transmitted in place of the second (i.e., the last in this example) substituted sequence X2 (or more generally, the k−1th substitute sequence is transmitted in place of the kth substituted sequence).

To illustrate the improvement in efficiency offered by the frame, the above-mentioned 8 kbit/s TRAU frame may be considered by way of example.

The 8 kbit/s TRAU frame contains 160 bits in total, including a synchronization pattern formed of eight 0 bits.

In the prior art, a 1 bit is inserted every 7 bits so as to prevent the synchronization pattern from being imitated by the payload data, i.e., 25 bits in all are assigned to synchronization.

For example, in the invention, a substitute sequence (please refer to the substitute sequence described with reference to FIG. 5) contains 8 address bits, i.e., 11 bits in all (assuming that each of the items of data such as S10, S20, P, and V comprises one bit only).

The forbidden sequences, or substituted sequences, are then advantageously sequences of 11 bits, and the synchronization pattern also advantageously comprises a sequence of 11 bits, plus one bit for indicating the end of the sequence, in which case, and taking into account one bit corresponding to the first operating data S0, an improvement in efficiency of 12 bits can be obtained.

Figure 6:
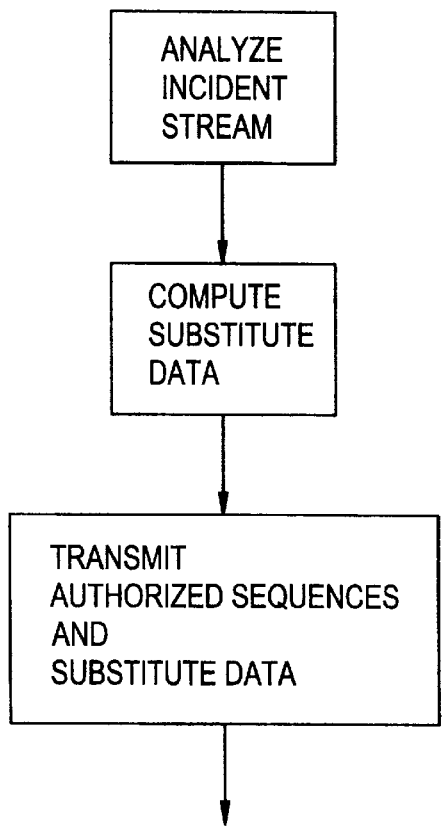
FIG. 6 is a flow chart showing a method of forming frames as in said first example or as in said second example from an incident stream of payload data.

FIG. 6 is a flow chart showing a method of forming frames, and the method is applicable both for the example shown in FIG. 2 and for the example shown in FIG. 3.

This method comprises the following steps:

1. analyzing said incident stream to detect payload data sequences that imitate said forbidden sequence;

2. computing substitute data serving to enable said forbidden sequences to be re-inserted, on reception, among the received payload data; and 3. transmitting the resulting computed substitute data and the authorized sequences in the desired order.

The analysis is further advantageously performed by means of a sliding window of width equal to N bits, where N designates the number of bits in a forbidden sequence.

FIG. 7 is an algorithm showing a method of forming frames as in the example shown in FIG. 4 from an incident stream of payload data.

To form the payload of each frame to be transmitted, the method comprises the following steps:

1. initializing a variable P corresponding to a current address to a value equal to zero;

2. initializing a variable referenced A to a value corresponding to an impossible address value, e.g., equal to −1;

3. waiting for 2M bits of the incident stream to be received in an input buffer register (where M designates the number of bits in the synchronization pattern); and 4. detecting whether the first M received bits stored in the input buffer register correspond to a forbidden sequence referenced X.

If a forbidden sequence is detected and the variable A is equal to the impossible value, the invention removes the first M received bits from the input buffer register, reinitializes the variable A to the value of the variable P; increments the variable P by a value equal to M, and detects whether the current address corresponds to the end of the frame.

When the invention detects the end of the frame, if A is not equal to the impossible value the invention transmits the substitute sequence S(A) corresponding to a forbidden sequence to be inserted, on reception, at the address A, transmits the first operating data S0 indicating that one or more substitute sequences are present in the frame (which is shown by "transmit modification indication"), and returns to the beginning of the algorithm. Otherwise, if the invention detects the end of the end of the frame and if A is equal to the impossible value, the invention transmits the first operating data S0 indicating that no substitute sequences are present in the frame (which is shown by "transmit non-modification indication"), and then returns to the beginning of the algorithm.

If the invention does not detect when the end of the frame, the invention returns to the step of detecting any forbidden sequences.

If the variable A is not equal to the impossible value, then the invention transmits the substitute sequence S(A).

If no forbidden sequences are detected by the invention, then the invention removes the first received bit; from the buffer register, transmits the first received bit, increments the variable P by 1, and returns to the step of detecting the end of the frame.

The present invention also provides apparatus for transmitting frames of the invention, the apparatus including means for implementing the various steps of the above-described transmission methods.

Since implementing such means poses no particular difficulty for a person skilled in the art, said means are not described in more detail than through their function. In general, such apparatus comprises:

means for analyzing an incident stream to detect payload data sequences imitating an forbidden sequence;

means for computing substitute data serving to enable the forbidden sequences to be re-inserted, on reception, among the received payload data; and means for transmitting payload data containing no forbidden sequences, and substitute data computed in this way, so as to form said frame.

Figure 8:
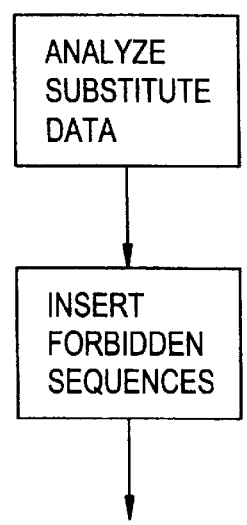
FIG. 8 is a flow chart showing a method of extracting payload data from received frames, the frames being as in said first example.

FIG. 8 is a flow chart showing a method of extracting payload data from received frames, and the frames being as in the example shown in FIG. 2.

This method comprises the following steps:
1. analyzing substitute data; and
2. inserting forbidden sequences among the received payload data in the manner determined by analyzing said substitute data.

Figure 9:
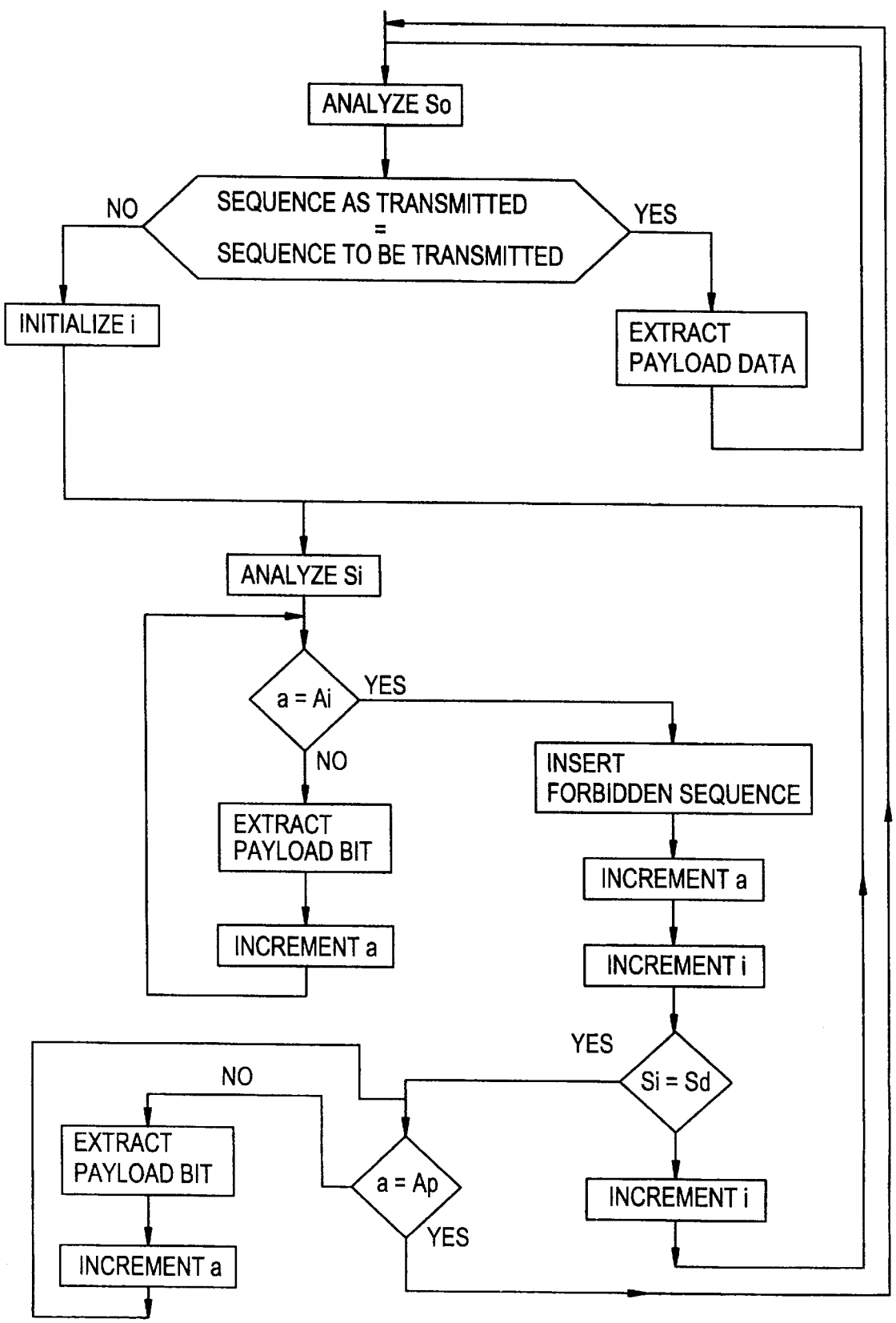
FIG. 9 is a flow chart showing a method of extracting a stream of payload data from received frames, the frames being as in said second example or as in said third example.

FIG. 9 is a flow chart showing a method of extracting a stream of payload data from received frames, the method being applicable both to the example shown in FIG. 3 and also, with the modifications indicated below, to the example shown in FIG. 4.

Each time a synchronization pattern is detected, the method comprises the following steps:
1. initializing a variable "a" corresponding to a current address; and
2. analyzing first operating data S0 after the detected synchronization pattern and indicating whether or not the payload data sequence as transmitted differs from the payload data sequence to be transmitted. If the analysis shows that the payload data sequence as transmitted does not differ from the payload data sequence to be transmitted, the method extracts the payload data as transmitted so as to form the output payload data stream. If the analysis shows that the payload data sequence as transmitted differs from the payload data sequence to be transmitted, then the method analyzes the first substitute sequence S1 after the first operating data S0 to determine the address A1 at which to insert the first forbidden sequence, i.e., in this example also the address of the second substitute sequence S2. The method also determines, on the basis of the operating data S10 contained in the substitute sequence S1, whether or not the substitute sequence is the last in the frame. Next, the method of the invention compares the current address "a", with the address A1. So long as "a" is less than A1, the invention extracts the payload data bit situated at the current address in order to form the output payload data stream, then increments the current address "a" accordingly, and returns to the step of comparing the current address "a" with the address A1.

If "a" is equal to A1, the invention inserts a forbidden sequence to form the output payload data stream, and then increments the current address "a" accordingly.

The invention does a parallel analysis, wherein if the substitute sequence S1 is not the last in the frame, the invention analyzes the second substitute sequence S2 situated at the address A1 to determine the address A2 at which to insert the second forbidden sequence (i.e., also the address of any substitute sequence S3). The method also determines, on the basis of the operating data S20 contained in the substitute sequence S2, whether or not the substitute sequence is the last in the frame.

So long as "a" is less than A2, the invention extracts the payload data bit situated at the current address to form the output payload data stream, increments the current address "a" accordingly, and returns to the step of comparing the current address "a" with the address A2.

If "a" is equal to A2, the invention inserts a forbidden sequence to form the output payload data stream, and then increments the current address "a" accordingly.

The invention repeats the analysis process, until the last sequence, referenced Sd, of the received frame, which is shown in FIG. 9 by a loop in which an index is caused to vary until Si becomes equal to Sd in which case when Si equals Sd.

So long as "a" is less than the address Ap of the last payload bit of the incident frame, the invention extracts the payload data bit situated at the current address to form the output payload data stream, and then increments the current address accordingly. Otherwise, if "a" is equal to Ap, the invention returns to the beginning of the algorithm.

The same method remains applicable for received frames that are as in the example shown in FIG. 4, provided that the synchronization pattern to be detected is considered to be the synchronization pattern of the following frame, and provided that the order in which substitute sequences are analyzed is inverted as explained with reference to FIG. 4.

The present invention also provides apparatus for receiving frames of the invention, and the apparatus includes means for implementing the various steps of the above-described reception methods.

Since implementing such means poses no particular difficulty for a person skilled in the art, said means are not described in more detail than through their function. In general, such apparatus comprises:
1. means for analyzing substitute data in incident frames; and
2. means for inserting forbidden sequences among the payload data extracted from said incident frames at the locations obtained by analyzing said substitute data so as to form said output payload data stream.

What is claimed is:

1. A data transmission frame formed by a transmitter and comprising a synchronization pattern, payload data and substitute data, said frame not comprising any payload data sequence that imitates said synchronization pattern, each payload data sequence that imitates said synchronization pattern being identified as a forbidden sequence; and said forbidden sequences being replaced by said substitute data, thereby allowing said forbidden sequences to be re-inserted on reception among said received payload data.

2. A frame according to claim 1, wherein said substitute data comprises:

operating data to determine to which extent forbidden sequences a present in the payload data; and address data that indicates the locations where a forbidden sequence is to be inserted among the received payload data.

3. A frame according to claim 1, wherein said substitute data comprises:

first operating data that indicates if forbidden sequences are present in the payload data to be transmitted; and a substitute sequence for each forbidden sequence, said substitute sequence comprising:

the address where said forbidden sequence is to be inserted in the received payload data, and second operating data that indicates if said substitute sequence is the last in the frame as transmitted.

4. A frame according to claim 3, wherein said substitute sequence further comprises protective data that protects said substitute sequence against transmission errors.

5. A frame according to claim 3, wherein said substitute sequence further comprises:

locking data that prevents a forbidden sequence from being reproduced by inserting a substitute sequence into the frame as transmitted.

6. A frame according to claim 3, wherein the number of bits in a substitute sequence is equal to the number of bits in a forbidden sequence.

7. A frame according to claim 6, wherein n bits out of the N bits in a substitute sequence are used for said address data, wherein N represents the number of bits in a substitute sequence and n is less than or equal to N−1, and the maximum number of bits per frame is equal to $2^n$.

8. A frame according to claim 3, wherein the first substitute sequence is transmitted after said first operating data, and the k-th substitute sequence is transmitted in place of the k−1th forbidden sequence, wherein k represents an index varying between 2 and the number of substitute sequences in said payload data.

9. A frame according to claim 3, wherein said second operating data indicates whether or not a substitute sequence is the last starting from the end of the frame.

10. A frame according to claim 9, wherein the last substitute sequence is transmitted before said first operating data, and the k−1th substitute sequence is transmitted in place of the k-th forbidden sequence, wherein k represents an index varying between 2 and the number of substitute sequences in said payload data.

11. A frame according to claim 3, wherein said second operating data indicates whether or not a substitute sequence is the last starting from the beginning of the frame.

12. A frame according to claim 1, wherein all of said substitute data precedes said payload data.

13. A method of transmitting frames according to claim 1, wherein said frames are formed from an incident stream of payload data, said method comprising:

analyzing said incident stream to detect any payload data sequences that imitate said forbidden sequence;

computing substitute data to enable forbidden sequences to be re-inserted on reception among the payload data; and transmitting payload data that contains no forbidden sequences and substitute data to form said frame.

14. A method according to claim 13, wherein said incident stream is analyzed by sliding a window of width equal to N bits, where N is equal to the number of bits in a forbidden sequence.

15. A method according to claim 13, wherein said computing of substitute data requires said incident payload data to be analyzed over a length that is long enough to enable all of the substitute data of a frame to be computed prior to transmitting the first payload bit of said frame.

16. A method according to claim 13, wherein said computing of substitute data requires said incident payload data to be analyzed over a length that is shorter than that required to enable all of the substitute data of a frame to be computer prior to transmitting the first payload bit of said frame.

17. An apparatus for transmitting frames according to claim 1, said apparatus enabling such frames to be formed from an incident stream of payload data, said apparatus comprising:

an analyzer that analyzes said incident stream to detect any payload data sequences that imitate said forbidden sequence;

a computer that computes substitute data serving to enable forbidden sequences to be re-inserted on reception among the payload data; and a transmitter that transmits payload data that does not contain any forbidden sequences and substitute data to form said frame.

18. A radiocommunications network for mobile stations, said radiocommunications network comprising an apparatus according to claim 17.

19. A method of receiving frames according to claim 1, wherein a stream of payload data is extracted from the receive frames, said method comprising:

analyzing substitute data in the received frames; and inserting forbidden sequences among the payload data extracted from the incident frames, the insertion being performed at the locations obtained by analyzing said substitute data, so as to form said stream of payload data.

20. An apparatus for receiving frames according to claim 1, wherein said apparatus extracts a stream of payload data from the received frames, said apparatus comprising:

an analyzer that analyzes substitute data in the received frames; and an sequence inserter that inserts forbidden sequences among the payload data extracted from the received frames, wherein said forbidden data is inserted at the locations obtained by analyzing said substitute data, thereby forming said stream of payload data.

21. A radiocommunications network for mobile stations, said radiocommunications network comprising an apparatus according to claim 20.

22. An apparatus for a radiocommunications network for mobile stations, said apparatus transmits frames according to the method of claim 1.

23. The apparatus according to claim 22, wherein said radiocommunications network is a Global Systems for Mobile Communications network.

24. An apparatus for a radiocommunications network for mobile stations, said apparatus receives frames according to the method of claim 1.

25. The apparatus according to claim 24, wherein said radiocommunications network is a Global Systems for Mobile Communications network.

26. A data transmission frame formed by a transmitter and comprising a synchronization pattern, payload data and substitute data, said frame not comprising any payload data sequence that imitates at least a portion of said synchronization pattern, each payload data sequence that imitates at least a portion of said synchronization pattern being identified as a forbidden sequence; and said forbidden sequences being replaced by said substitute data, thereby allowing said forbidden sequences to be re-inserted on reception among said received payload data.

* * * * *